United States Patent
Liu et al.

(10) Patent No.: US 9,946,353 B2
(45) Date of Patent: Apr. 17, 2018

(54) PORTABLE ELECTRONIC DEVICE AND MESSAGE PROCESSING METHOD THEREFOR

(71) Applicant: HTC Corporation, Taoyuan, Taoyuan County (TW)

(72) Inventors: Cheng-Hsi Liu, Taoyuan (TW); Wei-Chien Wang, Taoyuan (TW)

(73) Assignee: HTC CORPORATION, Taoyuan, Taoyuan County (TW)

(*) Notice: Subject to any disclaimer, the term of this patent is extended or adjusted under 35 U.S.C. 154(b) by 19 days.

(21) Appl. No.: 14/465,156

(22) Filed: Aug. 21, 2014

(65) Prior Publication Data

US 2016/0054801 A1 Feb. 25, 2016

(51) Int. Cl.
*G06F 3/01* (2006.01)
*G06F 3/16* (2006.01)
*H04L 15/00* (2006.01)
*H04M 1/725* (2006.01)

(52) U.S. Cl.
CPC ............. *G06F 3/017* (2013.01); *G06F 3/167* (2013.01); *H04L 15/00* (2013.01); *H04M 1/72552* (2013.01); *G06F 2200/1636* (2013.01)

(58) Field of Classification Search
CPC ................ G06F 3/041–3/047; G06F 2203/04101–2203/04113; G06F 3/017; G06F 3/167; G06F 2200/1636; G06F 3/0488; H04L 15/00; H04M 1/72552; G09B 21/00–21/06

USPC ......... 345/173–178; 178/18.01–18.09, 18.11
See application file for complete search history.

(56) References Cited

U.S. PATENT DOCUMENTS

| | | | |
|---|---|---|---|
| 8,000,729 B1* | 8/2011 | Jones ................. | H04L 12/5895 455/418 |
| 8,717,151 B2* | 5/2014 | Forutanpour ....... | G06F 3/04847 340/407.1 |
| 2004/0203613 A1* | 10/2004 | Zhu ..................... | H04M 1/578 455/412.1 |
| 2007/0168097 A1* | 7/2007 | Vanderley ............ | B60R 21/0132 701/45 |
| 2011/0109540 A1* | 5/2011 | Milne .................. | G06F 1/1694 345/156 |
| 2012/0127089 A1* | 5/2012 | Waas ................... | G06F 3/04883 345/173 |
| 2013/0339025 A1* | 12/2013 | Suhami ................ | H04R 25/00 704/271 |

FOREIGN PATENT DOCUMENTS

TW    I423645 B    1/2014

* cited by examiner

*Primary Examiner* — Stephen Sherman
(74) *Attorney, Agent, or Firm* — Hauptman Ham, LLP

(57) ABSTRACT

A message processing method for a portable electronic device includes the steps of: detecting, by a motion sensor, a plurality of first knocks of an object on the portable electronic device and generating a plurality of first detecting signals according to the plurality of first knocks; and encoding, by an encoding system, the plurality of first detecting signals to generate a first message code, wherein a first message is decodable from the first message code by a decoding system.

8 Claims, 5 Drawing Sheets

PORTABLE ELECTRONIC DEVICE AND MESSAGE PROCESSING METHOD THEREFOR

BACKGROUND

1. Field of the Disclosure

This disclosure generally relates to a portable electronic device and, more particularly, to a portable electronic device and a message processing method therefor that utilize a motion sensor to detect a plurality of specific knocks so as to generate message codes.

2. Description of the Related Art

The mobile communication device such as a smart phone and a tablet computer has become one of the necessary electronic products in everyday life because it adopts various additional functions and is easy to carry. Meanwhile, due to the popularity of communication application programs and different use requirements, operable functions are being updated continuously.

Presently, it is known that the mobile communication device may use a gravity sensor to detect the rotating operation such that a display direction of the displayed screen is changeable according to the usage state thereby improving the user experience. However, the current development trend of the mobile communication device is mostly related to the visual demand. For example, one of the development trends of the mobile communication device is to increase the screen size and the screen resolution, but increasing the screen size and the image resolution is not practical to the visually disabled users. In addition, in some conditions a user may not be able to directly hold the mobile communication device to operate, e.g. meeting. Accordingly, preferably it is desirable to allow the user to be able to operate the mobile communication device without looking at the screen so as to be adaptable to visually disabled users or operable under particular conditions.

SUMMARY

Accordingly, the present disclosure provides a portable electronic device and a message processing method therefor that utilize a motion sensor to detect knocking messages of a user and identify input messages of a specific coding to execute a predetermined application program, and to represent or transmit the messages.

The present disclosure provides a portable electronic device and a message processing method therefor that may use a motion sensor to detect input messages of a predetermined coding, and transmit or represent the input messages so as to broaden the applicable range for the portable electronic device.

The present disclosure further provides a portable electronic device and a message processing method therefor that may recognize a knocking signal, a shaking signal and a rotating signal detected by a motion sensor, and encode only the knocking signal so as to improve the operating accuracy.

The present disclosure provides a message processing method for a portable electronic device. The portable electronic device includes a motion sensor. The message processing method includes the steps of detecting, by the motion sensor, a plurality of first knocks on the portable electronic device and generating a plurality of first detecting signals according to the plurality of first knocks; and encoding, by an encoding system, the plurality of first detecting signals to generate a first message code, wherein a first message is decodable from the first message code by a decoding system.

The present disclosure further provides a portable electronic device including a motion sensor and a processing unit. The motion sensor is configured to detect a plurality of first knocks of an object on the portable electronic device and generate a plurality of first detecting signals according to the plurality of first knocks. The processing unit is electrically coupled to the motion sensor and configured to receive the plurality of first detecting signals and encode, by an encoding system, the plurality of first detecting signals to generate a first message code, wherein a first message is decodable from the first message code by a decoding system.

In one aspect, the portable electronic device may further include a wireless receiving unit configured to receive a third message code by a wireless way, wherein the processing unit is further configured to decode the third message code to a third message by the decoding system.

In one aspect, the portable electronic device may further include a display device configured to display the first message and/or the third message, or include an audio player configured to play the first message and/or the third message.

The portable electronic device may be a smart phone, a tablet computer, a smart wearable device or a personal digital assistant.

The portable electronic device and the message processing method therefor according to some embodiments of the present disclosure may provide a user with a way to operate the portable electronic device by knocking on the device without directly looking at it so as to increase the utility of the portable electronic device.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
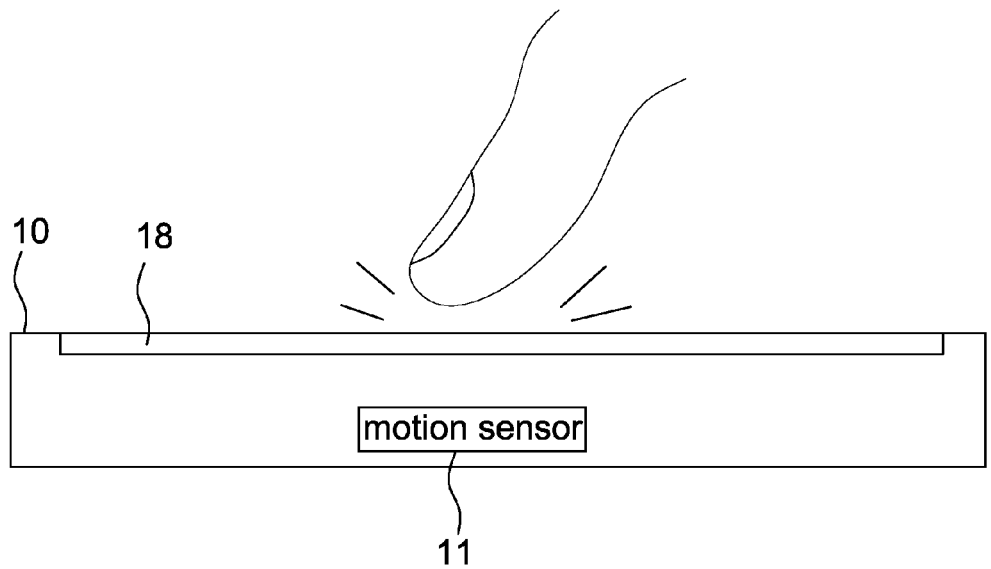
FIG. 1 is an operational schematic diagram of a portable electronic device according to one embodiment of the present disclosure.

Referring to FIG. 1, it is an operational schematic diagram of a portable electronic device 10 according to one embodiment of the present disclosure. The portable electronic device 10 detects a knocking operation of a user by a motion sensor 11 to replace the traditional input method using a key or a touch panel such that the user can still operate the portable electronic device 10 without directly looking at a display device 18 of the portable electronic device 10 thereby increasing the utility thereof.

In addition, the portable electronic device 10 may encode detecting signals only when analyzing that the user's operation is not a shaking operation or a rotating operation so as to improve the identification accuracy. It should be mentioned that although FIG. 1 shows a knocking operation by a single finger of a user, it is not to limit the present disclosure. The user may use multiple fingers, his/her palm or other object(s) to knock on any position of the portable electronic device 10 without particular limitation as long as the motion sensor 11 is able to detect the knocking operation and accordingly output the detecting signals.

The portable electronic device 10 according to some embodiments of the present disclosure may be a mobile electronic device such as a smart phone, a tablet computer, a smart wearable device, a personal digital assistant or the like, but not limited thereto.

Figure 2:
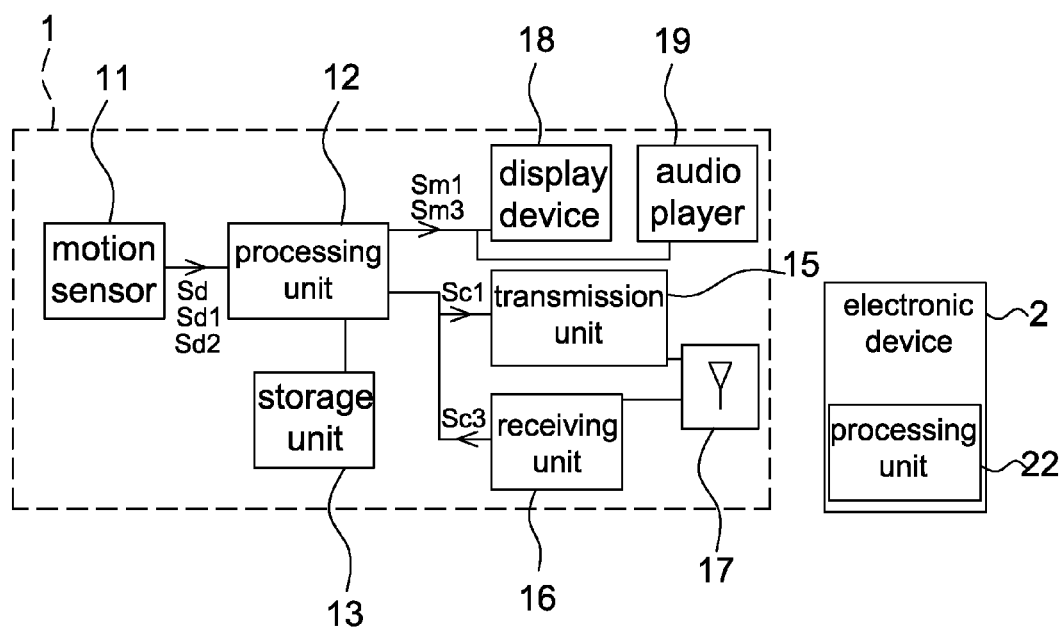
FIG. 2 is a block diagram of a portable electronic device according to one embodiment of the present disclosure.

Referring to FIG. 2, it is a block diagram of a first portable electronic device 1 according to one embodiment of the present disclosure. The first portable electronic device 1 of this embodiment includes a motion sensor 11, a processing unit 12, a storage unit 13, a transmission unit 15, a receiving unit 16, an antenna device 17, a display device 18 and an audio player 19, wherein the processing unit 12 is coupled to the motion sensor 11, the storage unit 13, the transmission unit 15, the receiving unit 16, the display device 18 and the audio player 19. In another embodiment, the transmission unit 15 and the receiving unit 16 are implemented by a wireless transceiver.

In this embodiment, the motion sensor 11 may be a G-sensor or an accelerometer and configured to detect a motion of the first portable electronic device 1 along three axes (e.g. X, Y, Z) in a three-dimensional space and to accordingly generate a corresponding detecting signal Sd, wherein the detecting signal Sd is configured to indicate, for example, a gravity acceleration value of the first portable electronic device 1 moving in the three-dimensional space. It should be mentioned that in the portable electronic device according to some embodiments of the present disclosure, preferably an application software (APP) is executed at first so as to activate the motion sensor 11 by the APP. The motion sensor 11 starts to detect the operation of the user to the first portable electronic device 1 after being activated to accordingly output the detecting signal Sd.

For example in one embodiment, the motion sensor 11 is configured to detect a plurality of first knocks of an object (e.g. a finger, a pen, a rod or the like without particular limitation) on the first portable electronic device 1, and generate a plurality of first detecting signals Sd1 according to the plurality of first knocks.

The processing unit 12 may be, for example, a central processing unit (CPU) and electrically coupled to the motion sensor 11 to receive the detecting signals Sd from the motion sensor 11, and recognizes an operation state, e.g. a rest state, a knocking state, a shaking state or other states, of the first portable electronic device 1 according to the detecting signals Sd (e.g. different gravity acceleration values). For example, when the motion sensor 11 is a G-sensor or an accelerometer, the processing unit 12 may identify the operation state of the first portable electronic device 1 according to the different gravity acceleration values generated by the G-sensor or the accelerometer. The processing unit 12 is able to recognize whether the detecting signals Sd of the motion sensor 11 indicate a continuous knocking state (e.g. larger gravity acceleration values for a shorter time interval) or a continuous shaking state (e.g. smaller gravity acceleration values for a longer time interval) of the first portable electronic device 1, and to perform an encoding process according to the detecting signals Sd when the knocking state is recognized so as to generate a message code (e.g. Morse code or other codes capable of indicating different messages). Otherwise, the message code is not generated, according to the detecting signals Sd, so as to execute other associated program or no response is generated.

For example in one embodiment, the processing unit 12 is configured to receive the plurality of first detecting signals Sd1 and encode the plurality of first detecting signals Sd1 by utilizing an encoding system (which may be an encoding program, such as a Morse code encoding program executed by the processing unit 12) so as to generate a first message code Sc1, wherein a first message Sm1 is decodable from the first message code Sc1 by a decoding system (which may be a decoding program, such as a Morse code decoding program executed by the processing unit 12).

The storage unit 13 is configured to store predetermined codes corresponding to predetermined messages, figures or symbols, and when the processing unit 12 confirms that a generated message code matches one of the predetermined codes, the predetermined message, figure or symbol corresponding to the predetermined code is represented or transmitted.

The transmission unit 15 may be, for example, a wireless transmission unit and configured to transmit the message code, which is generated by the encoding process of the processing unit 12, through the antenna device 17. In one embodiment, the transmission unit 15 is configured to transmit the first message code Sc1 to a remote portable electronic device (e.g. a second portable electronic device 2) by a wireless way, wherein the remote portable electronic device has the decoding system (which may be a decoding program, such as a Morse code decoding program executed by a processing unit 22 included therein) configured to decode the first message code Sc1 to a first message.

In addition, the receiving unit 16 may be, for example, a wireless receiving unit and configured to receive a message code from a remote portable electronic device (e.g. the second portable electronic device 2) through the antenna device 17, and the message code is sent to the processing unit 12 for a decoding process so as to generate a decoded message. In one embodiment, the receiving unit 16 is configured to receive a third message code Sc3 by a wireless way, wherein the processing unit 12 is further configured to decode the third message code Sc3 to a third message Sm3 by utilizing the decoding system thereof. The third message code Sc3 is obtained by encoding detecting signals of a plurality of knocks detected by a motion sensor of the remote portable electronic device.

In this embodiment, the second portable electronic device 2 is configured to communicate message codes with the first portable electronic device 1, wherein the second portable electronic device 2 is not necessary to have identical hardware and software as the first portable electronic device 1 but at least includes a processing unit 22 which has a function of encoding the detecting signals of a plurality of knocks detected by a motion sensor. And encoded codes of the second portable electronic device 2 are decodable by the first portable electronic device 1.

The display device 18 is configured to display the first message Sm1 to which the first message code Sc1 is decoded by the decoding system utilized by the processing unit 12 and the third message Sm3 to which the third message code Sc3 is decoded by the decoding system utilized by the processing unit 12. The display device 18 may be, for example, a touch display device or other display devices.

The audio player 19 is configured to play the first message Sm1 to which the first message code Sc1 is decoded by the decoding system utilized by the processing unit 12 and the third message Sm3 to which the third message code Sc3 is decoded by the decoding system utilized by the processing unit 12. The audio player 19 includes, for example, a speaker.

In other embodiments, the motion sensor 11 is further configured to detect a plurality of second knocks of an object on the first portable electronic device 1 and to generate a plurality of second detecting signals Sd2 according to the plurality of second knocks. The processing unit 12 is further configured to encode, by utilizing the encoding system thereof, the plurality of second detecting signals Sd2 so as to generate a second message code, and further to decode the second message code to contact information by utilizing the decoding system thereof. The transmission unit 15 then transmits the first message code Sc1 to a remote portable electronic device (e.g. the second portable electronic device 2) by a wireless way according to the contact information.

Figure 3:
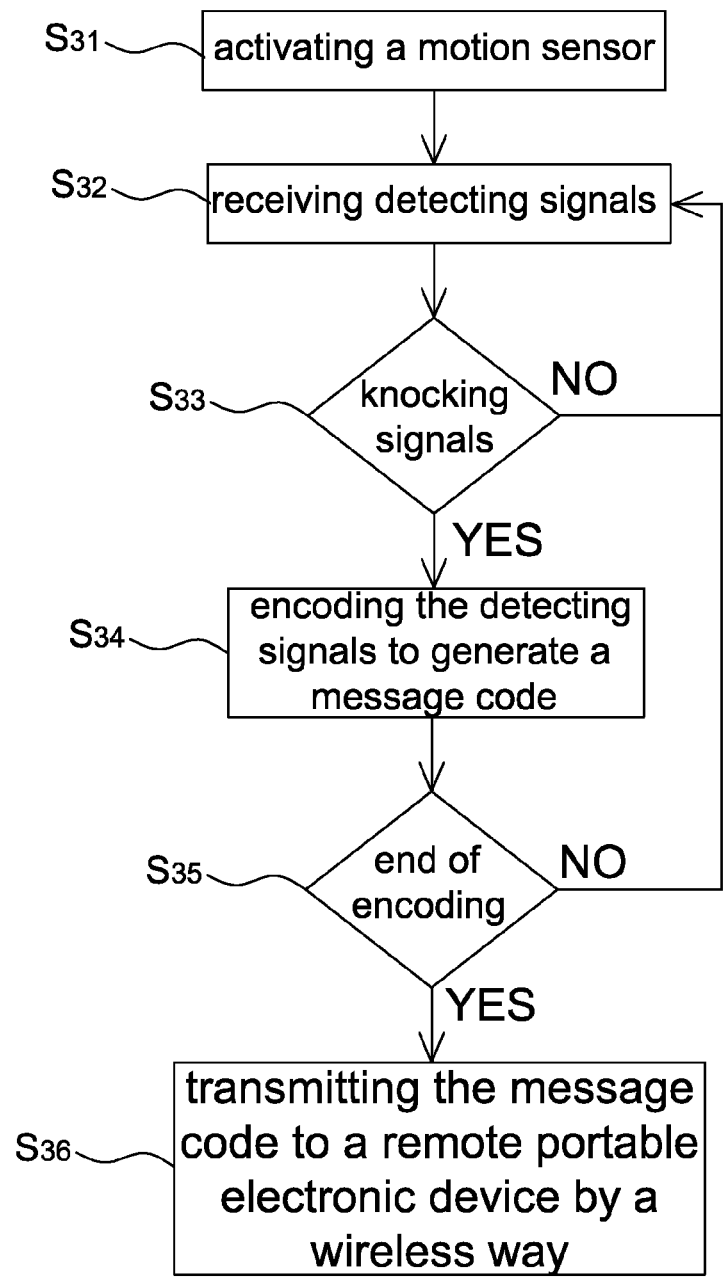
FIG. 3 is a flow chart of a message processing method for a portable electronic device according to a first embodiment of the present disclosure.

Referring to FIG. 3, it is a flow chart of a message processing method for a portable electronic device according to a first embodiment of the present disclosure. The method includes the steps of: activating a motion sensor (Step $S_{31}$); receiving detecting signals (Step $S_{32}$); identifying whether the detecting signals are knocking signals (Step $S_{33}$); encoding the detecting signals to generate a message code (Step $S_{34}$); identifying whether the encoding finishes (Step $S_{35}$); and transmitting the message code to a remote portable electronic device by a wireless way (Step $S_{36}$). Referring to FIGS. 1 to 3 together, details of this embodiment are illustrated hereinafter.

Step $S_{31}$: Firstly, the processing unit 12 activates the motion sensor 11 by executing an application software (APP). The motion sensor 11 continuously detects an operation state of the first portable electronic device 1 after being activated and outputs detecting signals Sd to the processing unit 12. In one embodiment, said APP is executed when a user clicks on an icon shown on a touch display device 18 of the first portable electronic device 1 and said APP is determined according to the function to be executed without particular limitation.

Step $S_{32}$: The processing unit 12 receives the detecting signals Sd, wherein the processing unit 12 confirms the operation state of the first portable electronic device 1 according to the detecting signals Sd. For example in one embodiment, the motion sensor 11 detects a plurality of first knocks of an object on the first portable electronic device 1 and generates a plurality of first detecting signals Sd1, which are then sent to the processing unit 12, according to the plurality of first knocks.

Step $S_{33}$: When the processing unit 12 identifies that the first detecting signals Sd1 are not knocking signals, the Step $S_{32}$ is returned and the first detecting signals Sd1 are ignored. When the processing unit 12 identifies that the first detecting signals Sd1 are knocking signals, the first detecting signals Sd1 are encoded.

Step $S_{34}$: The processing unit 12 encodes the first detecting signals Sd1 so as to generate a first message code Sc1 by utilizing an encoding system thereof, which may be an encoding program executed by the processing unit 12 as mentioned above. In this embodiment, the encoding system uses an encoding method that is familiar to the user, e.g. Morse code.

Step $S_{35}$: The processing unit 12 identifies whether the encoding finishes or not. If the processing unit 12 identifies that the encoding is not ended, the processing unit 12 continuously encodes the first detecting signals Sd1. Otherwise, if the processing unit 12 identifies that the encoding finishes, the processing unit 12 stops the encoding and sends the first message code Sc1 to the transmission unit 15. It should be mentioned that the motion sensor 11 continuously outputs the detecting signals at a sampling frequency after being activated. In this embodiment, the processing unit 12 identifies whether the encoding is ended by detecting a first detecting signal Sd1 indicating an end of encoding or by detecting whether an input device (e.g. a key) indicating an end of encoding is triggered (e.g. being pressed).

Step $S_{36}$: The transmission unit 15 transmits the first message code Sc1 by a wireless way to a remote portable electronic device (e.g. a second portable electronic device 2).

Figure 4:
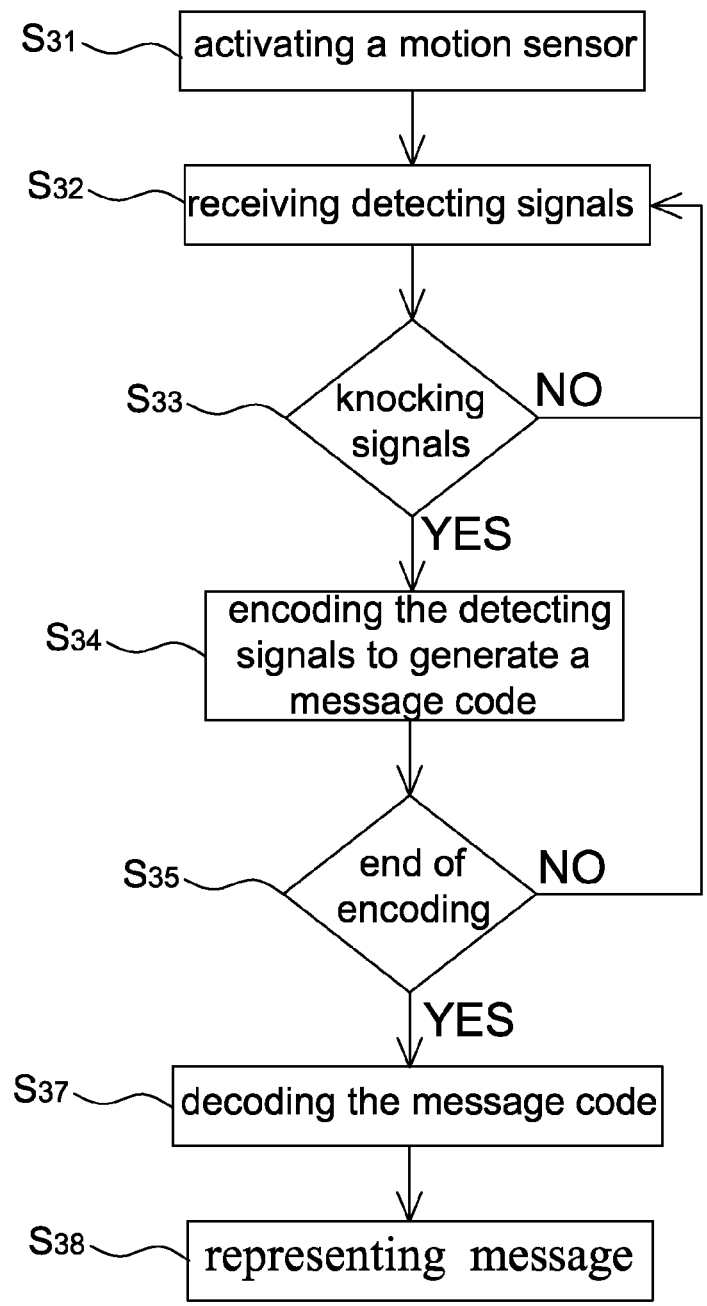
FIG. 4 is a flow chart of a message processing method for a portable electronic device according to a second embodiment of the present disclosure.

Referring to FIG. 4, it is a flow chart of a message processing method for a portable electronic device according to a second embodiment of the present disclosure The method includes the steps of: activating a motion sensor (Step $S_{31}$); receiving detecting signals (Step $S_{32}$); identifying whether the detecting signals are knocking signals (Step $S_{33}$); encoding the detecting signals to generate a message code (Step $S_{34}$); identifying whether the encoding finishes (Step $S_{35}$); decoding the message code (Step $S_{37}$); and representing a message (Step $S_{38}$). It is appreciated that in this embodiment, the Steps $S_{31}$ to $S_{35}$ are similar to those disclosed in FIG. 3 and thus details thereof are not repeated herein. Referring to FIGS. 1 to 4 together, details of the Step $S_{35}$, Step $S_{37}$ and Step $S_{38}$ of this embodiment are described hereinafter.

Step $S_{35}$: The processing unit 12 identifies whether the encoding finishes or not. If it is identified that the encoding is not ended, the processing unit 12 continuously encodes the first detecting signals Sd1. Otherwise, if it is identified that the encoding finishes, the processing unit 12 stops the encoding and generates a first message code Sc1.

Step $S_{37}$: The processing unit 12 decodes the first message code Sc1 to a first message Sm1 by utilizing a decoding system thereof, which may be a decoding program executed by the processing unit 12 as mentioned above. In one embodiment, the decoding system may compare the first message code Sc1 with at least one predetermined code stored in the storage unit 13 and identify whether a match occurs therebetween so as to obtain the first message Sm1. For example, if the match occurs, the obtained first message Sm1 may be a predetermined message, figure, symbol or the like corresponding to the predetermined code.

Step $S_{38}$: The first portable electronic device 1 represents the first message Sm1. In one embodiment, the first portable electronic device 1 displays the first message Sm1 by the display device 18, e.g. displaying the predetermined message, figure, symbol or the like. In another embodiment, the first portable electronic device 1 plays the first message Sm1 by the audio player 19, e.g. playing the predetermined sound effect or voice. In some embodiments, the first portable electronic device 1 may activate both the display device 18 and the audio player 19 so as to represent the first message Sm1 or the information corresponding to the first message Sm1.

Figure 5:
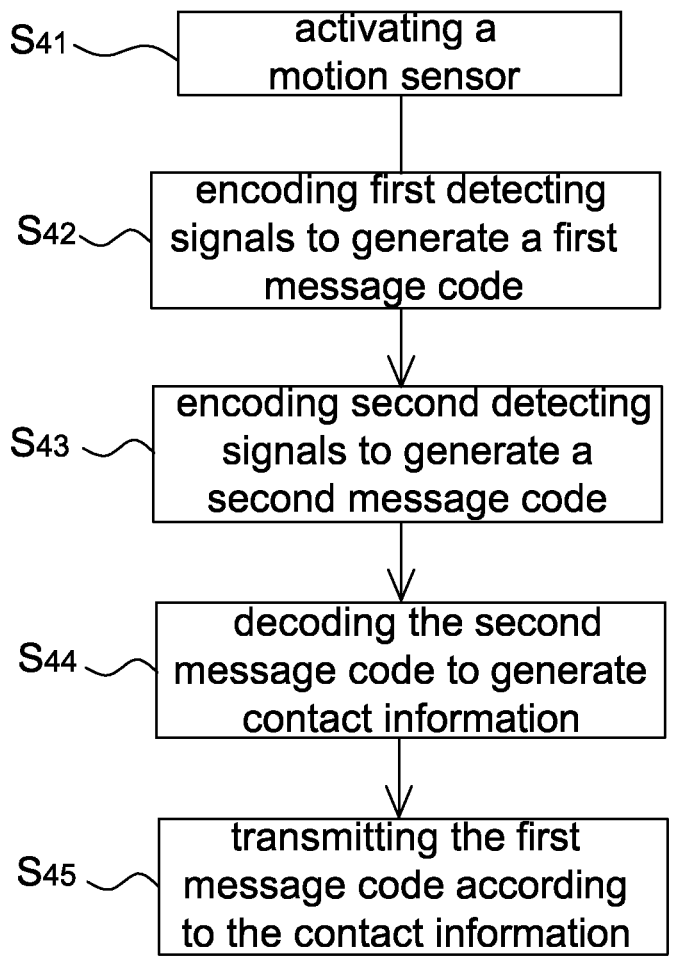
FIG. 5 is a flow chart of a message processing method for a portable electronic device according to a third embodiment of the present disclosure.

Referring to FIG. 5, it is a flow chart of a message processing method for a portable electronic device according to a third embodiment of the present disclosure. This embodiment is configured to illustrate the implementation of the first portable electronic device 1 transmitting the message code (e.g. Morse code message) to a remote portable electronic device (e.g. a second portable electronic device 2). The message processing method of this embodiment includes the steps of: activating a motion sensor (Step $S_{41}$); encoding first detecting signals to generate a first message code (Step $S_{42}$); encoding second detecting signals to generate a second message code (Step $S_{43}$); decoding the second message code to generate contact information (Step $S_{44}$); and transmitting the first message code (Step $S_{45}$). Referring to FIGS. 1 to 5 together, details of this embodiment are described hereinafter.

Step $S_{41}$: Similarly, the processing unit 12 activates the motion sensor 11 by executing an application software (APP). The motion sensor 11 continuously detects an operation state of the first portable electronic device 1 after being activated and outputs detecting signals Sd to the processing unit 12. In one embodiment, said APP is executed when a user clicks on an icon shown on a touch display device 18 of the first portable electronic device 1 and said APP is determined according to the function to be executed without particular limitation.

Step $S_{42}$: After the motion sensor 11 of the first portable electronic device 1 is activated, the motion sensor 11 continuously detects a plurality of first knocks of an object on the first portable electronic device 1, generates a plurality of first detecting signals Sd1 according to the first knocks and outputs the first detecting signals Sd1 to the processing unit 12. The processing unit 12 encodes the first detecting signals Sd1 outputted from the motion sensor 11 by utilizing an encoding system so as to generate a first message code Sc1. It should be mentioned that in this step the processing unit 12 may also perform the step of identifying whether the first detecting signals Sd1 are knocking signals (as the Step $S_{33}$ in FIG. 3), and when the first detecting signals Sd1 are not knocking signals, the first detecting signals Sd1 are ignored.

Step $S_{43}$: The motion sensor 11 continuously detects a plurality of second knocks of the object on the first portable electronic device 1, generates a plurality of second detecting signals Sd2 according to the second knocks and outputs the second detecting signals Sd2 to the processing unit 12. It should be mentioned that a sequence of the first knocks and the second knocks does not have particular limitation as long as a time interval between said first and second knocks is arranged in such a way that the processing unit 12 is able to distinguish between said first and second knocks. The processing unit 12 encodes the second detecting signals Sd2 by utilizing the encoding system so as to generate a second message code. Similarly, in this step the processing unit 12 may also perform the step of identifying whether the second detecting signals Sd2 are knocking signals (as the Step $S_{33}$ in FIG. 3), and when the second detecting signals Sd2 are not knocking signals, the second detecting signals Sd2 are ignored.

Step $S_{44}$: Next, the processing unit 12 decodes the second message code to contact information by utilizing a decoding system.

Step $S_{45}$: Finally, the processing unit 12 transmits, by a wireless way, the first message code Sc1 to a remote portable electronic device (e.g. a second portable electronic device 2) through the transmission unit 15 and the antenna device 17 according to the contact information. It is appreciated that the remote portable electronic device 2 preferably includes an identical decoding system, which may be a decoding program executed by a processing unit 22 included therein as mentioned above, so as to be able to decode the first message code Sc1 to the first message. The remote portable electronic device is also able to represent a message according to the decoded result, e.g. as the Step $S_{38}$ of FIG. 4.

Figure 6:
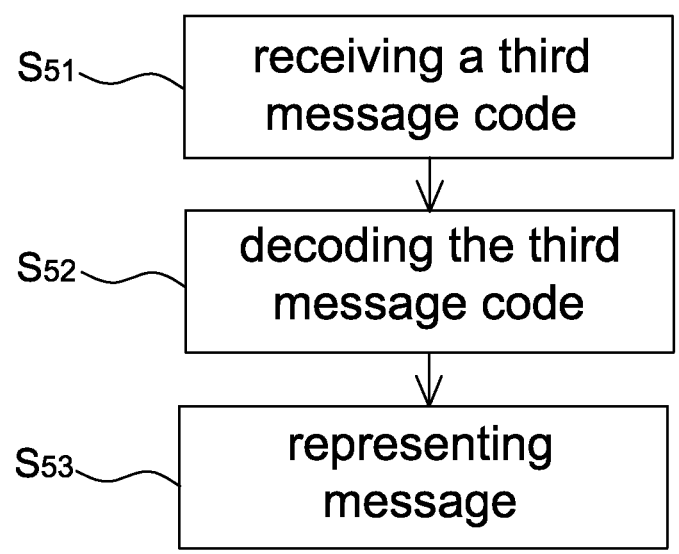
FIG. 6 is a flow chart of a message processing method for a portable electronic device according to a fourth embodiment of the present disclosure.

Referring to FIG. 6, it is a flow chart of a message processing method for a portable electronic device according to a fourth embodiment of the present disclosure The method includes the steps of: receiving a third message code (Step $S_{51}$); decoding the third message code (Step $S_{52}$); and representing a message (Step $S_{53}$). Referring to FIGS. 1 to 4 and 6 together, details of this embodiment are described hereinafter.

In this embodiment, the first portable electronic device 1 may receive a third message code Sc3 (e.g. Morse code message) via the antenna device 17 and the receiving unit 16 and perform decoding and representing functions, wherein the third message code Sc3 may be obtained by encoding the detecting signals of a plurality of knocks by a remote portable electronic device (e.g. the second portable electronic device 2), and the message code is decodable by the first portable electronic device 1. The difference between this embodiment and the above second embodiment is that in the second embodiment the first message code Sc1 is generated according to the detecting signals Sd1 of the first portable electronic device 1 itself, whereas in the fourth embodiment the third message code Sc3 is wirelessly received from a remote portable electronic device through the antenna device 17 and the receiving unit 16 (Step $S_{51}$). Next, the Steps $S_{52}$ and $S_{53}$ performed by the processing unit 12 are similar to the Steps $S_{37}$ and $S_{38}$ of FIG. 4 with only the processed target is changed from the first message code Sc1 to the third message code Sc3, and thus details thereof are not repeated herein. In other embodiments, the processing unit 12 may also control a vibrator to generate the vibration to be served as a method to represent decoded messages.

It should be mentioned that although the above embodiments take the Morse code as an example, but the present disclosure is not limited thereto.

As mentioned above, the conventional mobile communication device is operated by a user through a display screen or a key such that the operation is limited in some conditions. Therefore, the present disclosure further provides a portable electronic device (FIG. 2) and a message processing method therefor (FIGS. 3 to 6) that allow a user to input message(s) by knocking the portable electronic device with predetermined codes so as to increase the utility. In addition, the present disclosure further identifies whether the portable electronic device is in a rest state, rotating state or shaking state so as to increase the identification accuracy.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A message processing method for a portable electronic device, the portable electronic device comprising a motion sensor, the message processing method comprising:

detecting, by the motion sensor, a plurality of first operations and a plurality of second operations on the portable electronic device according to a plurality of gravity acceleration values generated by the motion sensor, and generating a plurality of first detecting signals according to the plurality of first operations and a plurality of second detecting signals according to the plurality of second operations;

encoding, by an encoding system, the plurality of first and second detecting signals when the first and second detecting signals are identified as knocking signals to generate a first message code and a second message code, wherein a first message is decodable from the first message code and a contact information is decodable from the second message code by a decoding system, and the knocking signals corresponding to the first operations are separated from the knocking signals corresponding to the second operations by a time interval; and not encoding the plurality of first and second detecting signals when the first and second detecting signals are identified as shaking operations, wherein the first and second detecting signals identified as the knocking signals have larger gravity acceleration values for a shorter time interval than the first and second detecting signals identified as the shaking operations.

2. The message processing method as claimed in claim 1, wherein the portable electronic device further comprises a display device and the decoding system, and the method further comprises:

decoding, by the decoding system, the first message code to the first message; and displaying, by the display device, the first message.

3. The message processing method as claimed in claim 1, wherein the portable electronic device further comprises an audio player and the decoding system, and the method further comprises:

decoding, by the decoding system, the first message code to the first message; and playing, by the audio player, the first message.

4. The message processing method as claimed in claim 1, further comprising:

transmitting, by a wireless way, the first message code to a remote portable electronic device, wherein the remote portable electronic device comprises the decoding system configured to decode the first message code to the first message.

5. The message processing method as claimed in claim 4, further comprising:

receiving, by the wireless way, a third message code from the remote portable electronic device; and decoding, by the decoding system of the portable electronic device, the third message code to a third message.

6. The message processing method as claimed in claim 1, further comprising:

executing an application software and activating the motion sensor by the application software.

7. The message processing method as claimed in claim 1, wherein the motion sensor is a G-sensor or an accelerometer.

8. The message processing method as claimed in claim 1, wherein the encoding system is a Morse code encoding system.

* * * * *